(12) United States Patent
Bumpus et al.

(10) Patent No.: US 7,751,428 B2
(45) Date of Patent: Jul. 6, 2010

(54) SYSTEM AND METHOD FOR ACCESSING SMASH-CLP COMMANDS AS A WEB SERVICE

(75) Inventors: Winston Bumpus, Austin, TX (US); Weifan Suen, Irving, TX (US)

(73) Assignee: Dell Products, LP, Round Rock, TX (US)

( * ) Notice: Subject to any disclaimer, the term of this patent is extended or adjusted under 35 U.S.C. 154(b) by 956 days.

(21) Appl. No.: 11/487,925

(22) Filed: Jul. 17, 2006

(65) Prior Publication Data

US 2008/0016143 A1 Jan. 17, 2008

(51) Int. Cl.
*H04J 15/00* (2006.01)
(52) U.S. Cl. ...................................... 370/464
(58) Field of Classification Search .......... 370/464, 370/466, 467, 469, 474; 709/227, 228, 245, 709/246, 250
See application file for complete search history.

(56) References Cited

U.S. PATENT DOCUMENTS

| | | | | |
|---|---|---|---|---|
| 6,738,630 B2* | 5/2004 | Ashmore | ............. | 455/456.3 |
| 6,925,461 B2* | 8/2005 | Byers | .................... | 707/3 |
| 7,039,722 B1* | 5/2006 | Fuisz et al. | ............. | 709/246 |
| 7,181,537 B2* | 2/2007 | Costa-Requena et al. | ... | 709/246 |
| 7,418,483 B2* | 8/2008 | Hess et al. | ............ | 709/219 |
| 7,480,915 B2* | 1/2009 | Costa Requena et al. | .... | 719/311 |
| 7,634,556 B2* | 12/2009 | Huynh et al. | ............ | 709/223 |
| 2006/0112174 A1* | 5/2006 | L'Heureux et al. | ......... | 709/223 |

OTHER PUBLICATIONS

Command Line Protocol, Version 1.1, Wreless Village, Jul. 31, 2002, pp. 1-35.*

* cited by examiner

*Primary Examiner*—Dmitry H Levitan
(74) *Attorney, Agent, or Firm*—Larson Newman & Abel, LLP

(57) ABSTRACT

Systems and methods for accessing Systems Management Architecture for Server Hardware (SMASH)-command line protocol (CLP) commands as a web service are provided. In one form, an information handling system having access to CLP commands within a SMASH includes an application program interface operable to provide access to CLP commands using a universal resource locator (URL) address. The system further includes a translator operable to convert the URL address into a CLP command and a command parser operable to parse the CLP command to execute the command. Responses to URL encoded CLP commands are communicated via the web service to a client and presented within the client's web browser.

13 Claims, 3 Drawing Sheets

SYSTEM AND METHOD FOR ACCESSING SMASH-CLP COMMANDS AS A WEB SERVICE

FIELD OF THE DISCLOSURE

The present disclosure generally relates to systems management, and particularly, to a system and method for accessing SMASH (Systems Management Architecture for Server Hardware)-CLP (Command Line Protocol) commands as a web service.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of system for accessing and managing hardware components within an information handling system is SMASH (Systems Management Architecture for Server Hardware). SMASH is an initiative from the DMTF (Desktop Management Task Force) that defines Command Line Protocol (CLP) as a standard human-oriented management interface for accessing managed systems in data center. The syntax and semantics of the commands for CLP, as well as how the commands get transferred over the network using character-based protocols such as telnet or Secure Socket Handler (SSH), are defined by the CLP specifications.

SMASH-CLP is an emerging standard that has received industry-wide support as the next generation interactive mode interface for managing a variety of devices. However, SMASH-CLP has several hurdles to overcome prior to becoming widely accepted and easily utilized. Foremost, most newcomers to SMASH-CLP face a steep learning curve prior to becoming efficient in SMASH-CLP. For example, new users must learn, at a minimum, a new command language, new console applications, and new protocols. Other problems or challenges to overcome include implementation requirements for SMASH-CLP by accessing either a telnet protocol, which has security deficiency, or a SSH protocol, which may incur overhead for lightweight devices. As such, what is needed is a system and method to reduce the learning curve associated with SMASH-CLP while maintaining sufficient security and minimal overhead for process limited devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
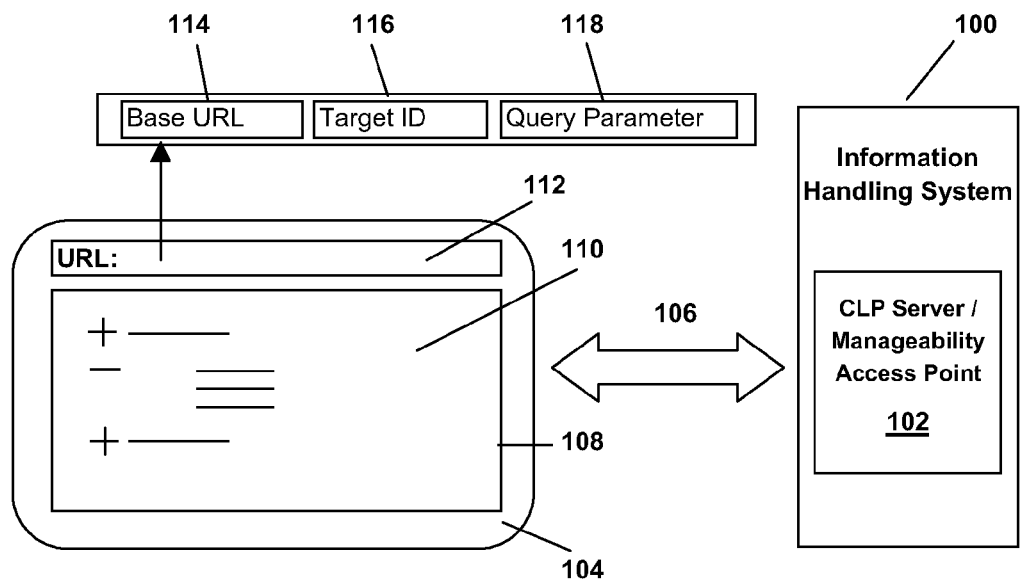
FIG. 1 illustrates an information handling system for communicating encoded commands for accessing and managing system hardware via a web service enabled interface according to one aspect of the invention.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on systems and methods for encoding Command Line Protocol (CLP) commands for server management systems as a web service. While the teachings may certainly be utilized in this application, the teachings may also be utilized in other applications and with several different types of architectures such as distributed computing architectures, client/server architectures, or middleware server architectures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

In one embodiment, an information handling system having access to command line protocol commands is provided. The system includes an interface operable to provide access to command line protocol (CLP) commands received in response to a CLP encoded universal resource locator (URL) address initiated by a browser-based client. The system further includes a translator operable to convert the CLP encoded URL address into a CLP command and a processor operable to execute the CLP command at least partially based on a target identified within the CLP encoded URL address.

In a further embodiment, a method of providing access to command line protocol (CLP) commands using an information handling system. The method includes the steps of receiving an encoded command line protocol (CLP) command request within a universal resource locator (URL) address from a browser-based client and determining a target identifier within the URL address. The method further includes executing the CLP command on the target.

In another embodiment, an information handling system operable to process command line protocol associated command information for providing access to command line protocol commands. The system includes an application interface operable to provide access to command line protocol (CLP) commands using a universal resource locator (URL) address. The system further includes a translator operable to convert the universal resource locator address into a command line protocol command and a command parser operable to parse the command line protocol command to execute the command.

FIG. 1 illustrates an information handling system for communicating encoded commands for accessing and managing system hardware via a web service enabled interface according to one aspect of the invention. An information handling system, illustrated generally at 100, includes a CLP Server 102 having an associated Manageability Access Point (MAP) operable to enable access to manageable hardware components. Information handling system 100 may be communicatively coupled to a client 104 such as a remote computing system operable to access a network such as the Internet, an Intranet, a virtual private network, or various other types of networks illustrated at 106. Client 104 may include various types of computer or network terminal systems or devices including a desktop or laptop computer system, a remote or local terminal, handheld computing device, or any other types of computer system operable to access information handling system 100 via network 106. Client 104 further includes a graphical user interface 108 operable to display a browser 110, and allow input of a universal resource locator (URL) address within web browser address bar 112. Browsers such as Microsoft Explorer, Netscape Mozilla, Firefox, or any other type of browser operable to display information communicated by information handling system 100 may be used by client 104. In one form, a custom browser or user interface may be used to access the Internet or an Intranet (not expressly shown).

Client 104 allows for input of a CLP command as query term provided within URL address input field 112 using standard URL syntax, and sent via an HTTP request to the URL address of information handling system 100 hosted by a CLP-enabled device. In this manner, a CLP user-friendly target instance may be embedded as part of a URL address. Information handling system 100 is operable to receive the encoded URL address and perform decoding functions as needed. For example, a decoder (not expressly shown) may exist as a part of information handling system 100 operable as a web server or may co-exist within CLP server 102. In one form, a proxy server (not expressly shown) for a native CLP implementation of decoding and encoding may also be provided.

During operation, a user inputs a URL address within URL address input field 112 to be communicated to information handling system 100 for exposing a portion of an application program interface (API) to access commands within CLP server 102 having an associated MAP. The URL address includes a base URL portion 114, a target ID portion 116, and a query portion 118 which are combined to form a URL address. One example of a URL address may be:

"https://jdd.test@acme.com:5959/system1?verb=show"

Base URL portion 114 includes a host name and user login information based on one or more specifications for accessing CLP commands within information handling system 100. For example, base URL portion 114 may include a format such as "jdd.test@acme.com:5959" where "jdd" is the user who logins to host "test@acme.com using port 5959." In the example shown, information handling system 100 would be responsive to URL addresses including "acme.com." A user would also input a target ID 116 for accessing one specific access point or device. For example, a target ID 116 value may include "system 1" to identify system 1 or server 1 using the MAP of CLP server 102. Various types of device or components may be accessed using target ID 116 as described below.

Query portion 118, includes the desired CLP command provided as a query after entering a "?". For example, the question "?" symbol in a URL address indicates that a query is being made and arguments for the query follow the "?". However, instead of providing standard query arguments, a CLP command line such as "show-level all" is provided to access the status of all components associated with "system1." When information handling system 100 receives a request from client 104 having a URL format including a valid base URL 114, target ID 116, and query parameter portion 118, information handling system 100 employs one or more processes to execute the CLP command line using CLP server 102. In this manner, a user need not access a telnet prompt, specific terminal, etc. to execute CLP commands.

In one embodiment, since "show" is the default verb for a query, a simple URL can be constructed without query parameter portion 118. For example, leaving query portion blank will correspond to a CLP command line "show" which is used to display the attributes of the current default target, or a target identified within target ID portion 116. In another embodiment, URL-encoding rules may need to be applied when a reserved character set of URL overlaps with some reserved characters used by CLP syntax. For example, a "space" between characters is encoded as "%20."

In one embodiment, a user may input complex CLP commands based on general URL grammar rules for queries and separated by ampersands (&). For example, the following key words are used to define corresponding CLP command terms as a means to form a URL input:

1. (verb, string, CLP command verb term (optional, the default is "show"))
2. (option, string, CLP command option term (optional))
3. (optionarg, string, CLP command option argument term (optional))
4. (property, string, CLP command property term (optional))

For example, a user may access a CLP command such as "show-level all/system1" by entering "verb=show&option=-level&optionarg=all" as a query parameter within query parameter portion 118 and "system1" within target ID portion 116. As such, a user of client 104 may realize an increase in the usability of CLP commands by using web browser address bar 112 for entering CLP commands from a remote location to access CLP-enabled devices as a web service provided by information handling system 100. Additionally, information handling system 100 need only include a modified web server for detecting and processing URL addresses having encoded CLP commands and further accessing a CLP command processor to perform command encoding and decoding functions.

Figure 2:
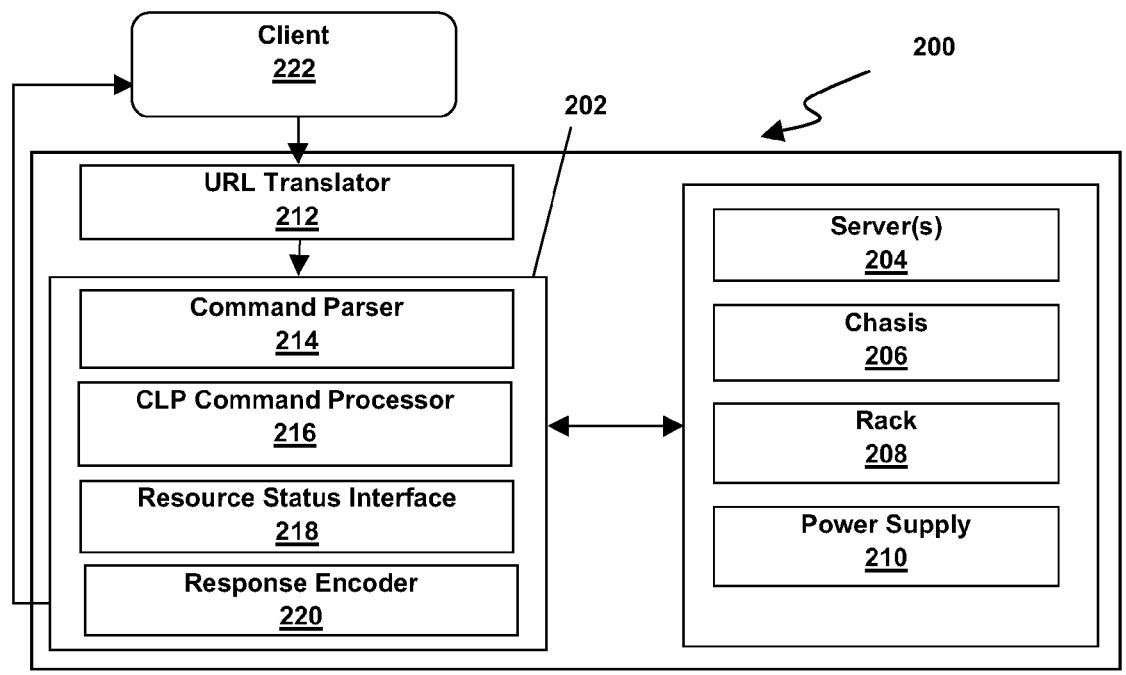
FIG. 2 shows an expanded view of an interface for implementing a web service for processing and communicating encoded commands for accessing and managing system hardware within an information handling system according to another aspect of the invention.

FIG. 2 shows an expanded view of an interface for implementing a web service for processing and communicating encoded commands for accessing and managing system hardware within an information handling system according to another aspect of the invention. An information handling system, illustrated generally at 200, includes logic for processing CLP commands for a CLP server/MAP 202 to access various components, software, files, devices, etc. Information handling system 200 may include one or more mounted servers, blades, partitioned servers, and/or Telco servers generally illustrated as server(s) 204 that may be accessed by CLP server/MAP 202. Information handling system 200 may further include various other devices accessible by CLP server/MAP 202 such as a chassis 206, racks 208 and power supplies 210, and enclosures and other network accessible devices (not shown at FIG. 2).

Information handling system 200 further includes a web server or application which includes a URL translator 212 operable to receive URL requests from a client 222. URL requests may include accessing a various forms of content or applications provided in association with a website. URL translator 212 further includes logic associated with detecting queries for accessing CLP commands when provided as standard syntax with a portion of a URL address.

CLP server/MAP 202 may be provided either resident to information handling system 200 or as a proxy server. CLP server/MAP 202 includes a command parser 214, a CLP command processor 216, a resources status interface 218, and a response encoder 220. For example, information handling system 200 operable as a CLP enabled system provides access to CLP command verbs that manipulate command targets representing Managed Elements (ME) that are within the scope of access by a MAP.

Information handling system 200 operable as a CLP enabled system provides the ability to enumerate and configure server hardware for an associated server within, and managed by a MAP using CLP server/MAP 202. For example, server(s) 204 and associated components may be provided within the scope of access of CLP server/MAP 202. In one embodiment, information handling system 200 may discover the current hardware configuration and properties, system settings, and local I/O devices. Additionally, information handling system 200 may provide some amount of configuration for local disk drives, including local arrays (not expressly shown). Information handling system 200 further allows for initial logical unit creation for installation and/or provisioning of servers such as server(s) 204. Information handling system 200 may also include the ability to select, control and initiate the transfer of software updates or images. For example, CLP enabled information handling system 200 may include a software installation service, such as a Centralized Installation Manager (CIM, not shown at FIG. 2), for installing software. Information handling system 200 may also control the boot configuration of any supported server and support for heartbeat and operating system status information may be provided.

Information handling system 200 further provides access to additional features of other server state controls such as power control, intervention capability (to halt, reset or shutdown a server) and mechanisms to initiate a dump of the operating system. CLP enabled information handling system 200 may also access and manipulate any accessible logs, view and set remote status displays, LEDs and alarms, configure alert destinations, and initiate a session with a remote text-based console device such as client 222.

Information handling system 200 includes logic to comply with Command Line Protocol (CLP) which defines the form and content of messages transmitted, and responses received, by client 222 communicatively via a network. Client 222 may include a browser such as browser 104 illustrated in FIG. 1 and configured to access various network locations through use of a universal resource locator address.

Figure 3:
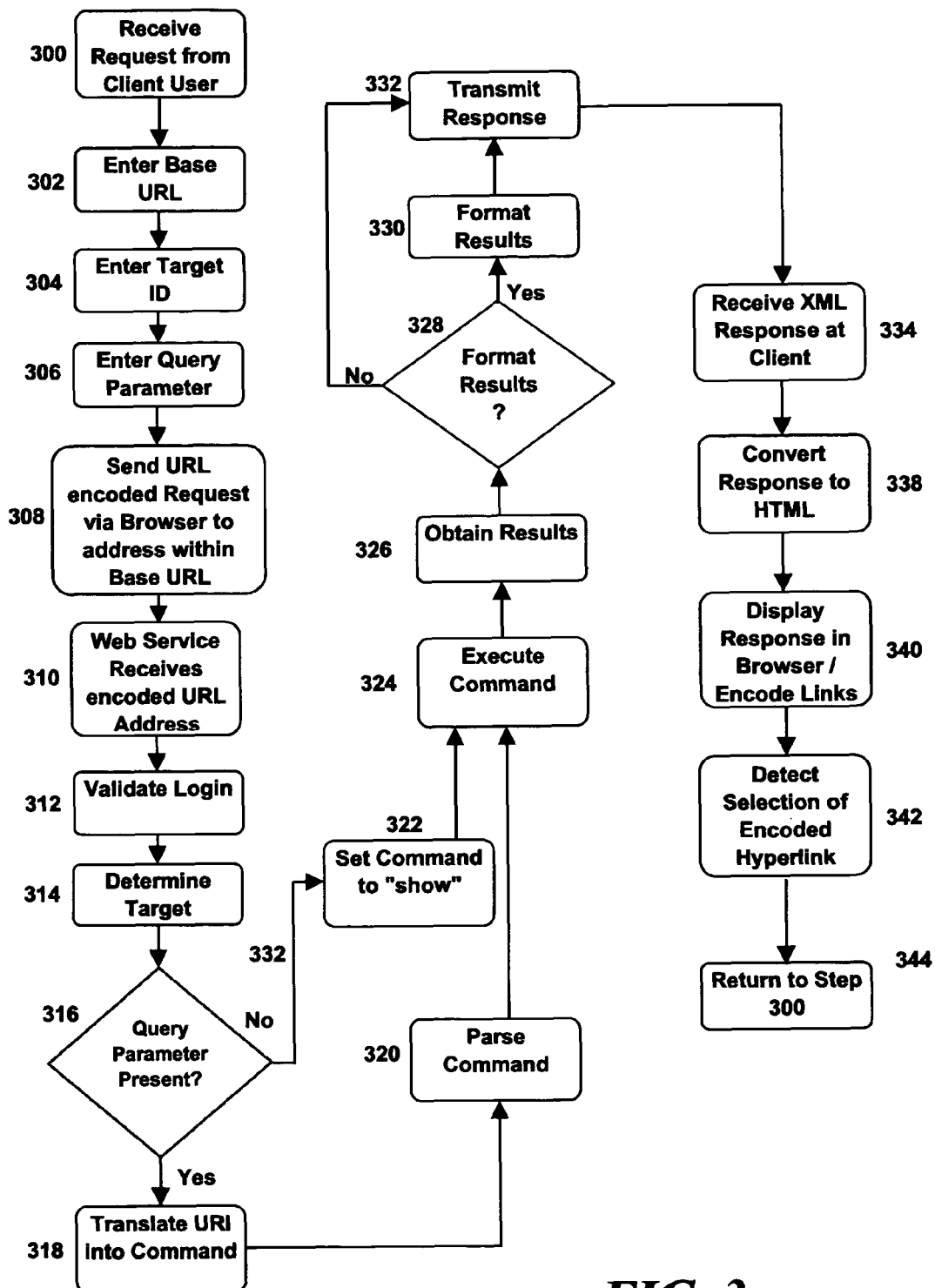
FIG. 3 presents an information system handling enabled flow diagram for executing command logic protocol commands using a URL address and web service according to a further aspect of the invention.

FIG. 3 presents a flow diagram for executing command logic protocol commands using a URL address and web service according to a further aspect of the invention. The method may be employed, in whole or in part, by the systems illustrated in FIGS. 1, 2, and 4 or any other type of system operable to use the method illustrated in FIG. 3. Further, the method of FIG. 3 may be encoded in whole or in part within a computer readable medium, encoded logic, as an applet or java script, or any other type of medium which may memorialize all, or portions, of the method illustrated in FIG. 3.

The method begins generally at step 300 when a client makes a request to access a CLP command for a CLP enabled information handling system by entering an encoded CLP command within a URL address used with a standard web browser having an address portion for inputting URL addresses and the request is received at a client system. At step 302, a user enters a base URL portion of the URL address which includes an identifier to authenticate the user. In one form, a user may enter an address using a Representational State Transfer (REST) format. REST is a format for inputting resource and user identifiers for accessing resources such as CPL commands within a CPL system and is well suited for use in association with a web service for accessing CLP commands for a CLP enabled information handling system. As such, a user may enter a base portion of the URL address by concatenating a host name of the CLP enabled system and user login information.

Upon entering a base URL value, at step 304 a user enters a target ID value for MAP (Manageability Access Point) value within the URL address field after the base URL potion. The MAP value is a target identifier to identifying a targeted system. For example, a user may enter values such as "/system1/fan1/", "/system2", etc. to access various points within a system or topology of devices.

At step 306, a user may then enter a CLP parameter portion after entering a "?" within the URL address. The "?" indicates that a query is to be performed and one or more values or parameters will be provided following the "?". FIG. 1 above illustrates several parameters and values that may be provided as a query. In one embodiment, a parameter may need not be provided following a "?" for accessing or executing a CLP command. For example, if a parameter is not present, a default command may be executed such as a "show" command.

Upon entering an encoded a URL address, a user may select an enter, go, send button for a browser and at step 308, the client system sends the URL encoded request to the destination provided within the URL encoded address. At step 310, the destination receives the request and employs a service, such as a web service, for handling the encoded URL address. For example, the web service may be provided as a part of a CLP enabled system or may be provided as a separate application or application program interface resident on a separate server or system. Upon receipt of the request, at step 312 the host name and user login information is validated, and upon validation at step 314, the encoded URL address is processed to determine a target ID value. For example, a target ID value may include a reference such as "system1" to identify system 1 or server 1 that fall within the scope of a MAP (Manageability Access Point). Various types of devices or components may be accessed.

Upon determining a target ID, the method proceeds to step 316 to determine if a query parameter exists within the encoded URL address. If a query parameter exists, the query parameter is translated 318 and parsed 320 to convert the query format into a CLP command format and determine the requested CLP command and any additional attributes or parameters requested for execution. If at step 316 a query parameter is not present, a default command such as "show" is set at step 322.

At step 324, the requested or default command is executed in compliance with a Command Line Protocol. For example, the command "system1/fan2" would access server 1's second fan to determine the operating status. Results are obtained at step 326 by a CLP-enabled system, and if the results are to be formatted as shown at step 328, the results are then translated into a format at step 330 that may be used by the requesting client. In one embodiment, a requested CLP command can set a default output format to be the XML format. In this manner, a user need not specify the output (e.g., "output=clpxml") option in each command. For example, the results may be provided using a universal mark-up language such as XML, HTML, etc. and transmitted at step 332 to the requesting client. At step 334, the client receives the XML formatted response to the CLP encoded URL address request and the response is converted 338 to HTML using Extensible Stylesheet Language Transformations (XSLT) and displayed to a user within a browser at step 340. In this manner, a user may make a request to access CLP commands using an URL address and receive responses to commands within a browser window as a part of a web service thereby reducing the amount of interaction required by a user to access CLP commands for managing servers, systems, hardware, etc.

In one form, a request or response may be presented to a user via an encoded hyperlink provided for presentation within a browser. For example, a response may be returned for a specific command and one or more objects presented within a browser may be encoded to include URL address encoded CLP commands for accessing CLP commands. In this manner, a user may need only provide a portion of a URL address for accessing a CLP enabled system and a response from a CLP enabled system employing a web service for accessing CLP commands may provide a response that includes objects such as images, hyperlinks, etc. having encoded CLP commands. Upon a user selecting an encoded object or hyperlink at 342, the method proceeds to step 344 and step 300 and formats the encodes the URL address with the command to access the CLP enabled system for processing the CLP command.

Figure 4:
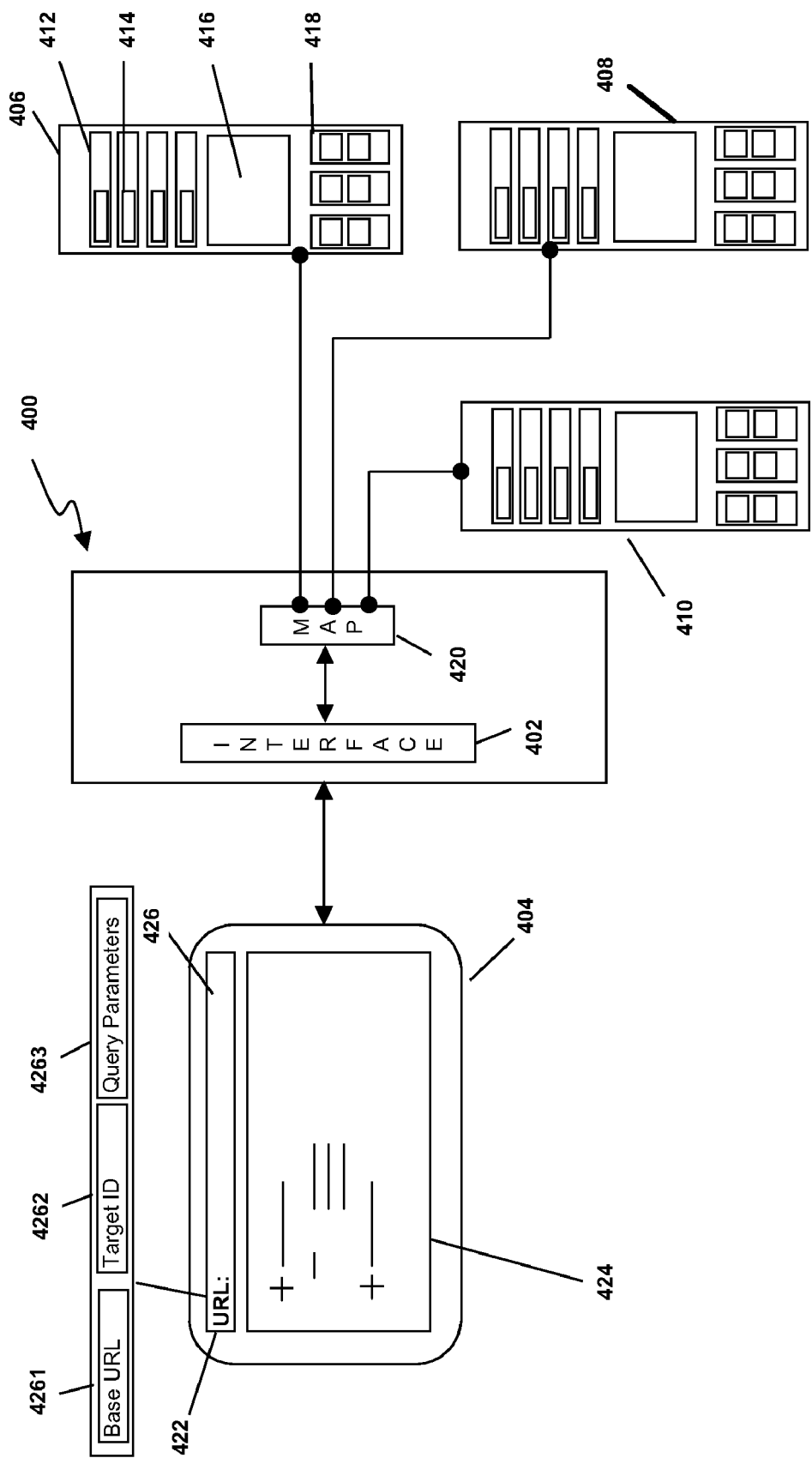
FIG. 4 illustrates an information handling system employing a web service enabled hardware management architecture system hardware and command logic protocol system according to one aspect of the invention.

FIG. 4 illustrates an information handling system employing a web service enabled hardware management architecture system according to one aspect of the invention. An information handling system, illustrated generally at 400, includes an interface 402 which may be coupled to a client 404 for accessing one or more server clusters such as first server cluster 406, second server cluster 408, and/or third server cluster 410.

Each server cluster may include one or more blade servers 412 having accessible components 414, a back plane 416, power supplies 418, or various other components that may be accessed through a MAP 420 of CLP enabled information handling system 400. CLP enabled information handling system 406 employs a Systems Management Architecture for Server Hardware Command Line Protocol ("SMASH-CLP") specification, which enables simple and intuitive management of heterogeneous servers such as blade servers 412 in a data center.

The SMASH-CLP specification addresses the end user requirement for a common command line syntax, allowing systems offered by different vendors to be managed in similar ways. For example, a CLP service employed by a server or system is designed to apply to a number of server topologies and is suited to manage one or more server clusters. SMASH-CLP builds on a Distributed Management Task Force (DMTF) Common Information Model (CIM) Schema and enables remote as well as local management of server hardware in both Out-of-Service and Out-of-Band management environments. SMASH-CLP delivers server management capabilities independent of machine state, operating system state, server system topology or access method.

During operation, a user of client 404 provides a URL address 426 including a base URL 4261 value, a target ID 4262 value, and query parameter 4263 values within a URL address field 422 of a web browser 424. CLP enabled information system 400 provides a mechanism for client 404 to access and indicate to MAP 420 requests for accessing CLP commands and a language desired by the client 404 for formatting responsive data received by CLP command requests. For example, CLP enabled information management system 400 may support various languages and, depending on the requested language, output data is presented to the user of client 404 with the appropriate translations. Service and subsequent responses are transmitted back to client 404. Each command transmitted generates one response data transmission to client 404 that includes the requested information for systems and devices that fall within the scope of MAP 420.

In one embodiment, CLP enabled information handling system 400 allows management applications to provide for efficiently navigation of entire object trees with in the CLP address domain of MAP 420. For example, an object topology map can be constructed by issuing a CLP command of "show-level all/." A response to a command may include outputting an XML format response which can be translated by a client side XSLT application to display HTML web pages that allow users of client 404 to easily drill down or select links for objects providing access to individual objects, or properties using point-and-click links, images, icons, etc. displayed within a browser window for client 404. In this manner, various objects associated with MAP 420 may be remotely accessed and displayed for a user at client 404 using a web based user interface and associated web service provided by CLP enabled information handling system 400 based on a desired output format for information requested from client 404.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing access to command line protocol (CLP) commands using an information handling system comprising the steps of:

receiving an encoded System Management Architecture for Server Hardware (SMASH) command line protocol (CLP) command request within a universal resource locator (URL) address from a browser-based client;

determining a target identifier within the URL address;
executing the CLP command on the target;
obtaining additional hardware information in response to executing the CLP command;
formatting the additional hardware information using a mark-up language; and
communicating the formatted additional hardware information to the browser-based client, the formatted information sufficient to be presented within a web-browser of the browser-based client in response to receiving the CLP encoded URL address.

2. The method of claim 1, further comprising:
decoding the URL address to extract a concatenated manageability access point (MAP) and a target identifier;
determining the CLP command; and
generating a response to the executed CLP command.

3. The method of claim 1, further comprising locating the target identified by the target identifier of the URL address.

4. The method of claim 1, further comprising communicating an XML formatted response to the browser-based client upon executing the CLP command.

5. The method of claim 4, further comprising:
providing a CLP encoded response operable to be displayed as an HTML link within a web browser;
associating status information for plural hardware devices for a manageability access point (MAP); and
enabling display of information at the web browser associated with the plural hardware devices in response to a user selecting the HTML link.

6. The method of claim 1, further comprising:
receiving a representational state transfer (REST) configured URL address communication from the browser-based client, the communication including an empty query parameter field within the CLP encoded URL address; and
executing a default CLP command on the target in response to the empty query parameter field.

7. The method of claim 1, further comprising:
accessing a web based interface in response to receiving the CLP encoded URL address; and
requesting processing of the CLP command using a CLP proxy server.

8. A method of providing access to command line protocol (CLP) commands using an information handling system, comprising the steps of:
receiving an encoded System Management Architecture for Server Hardware (SMASH) command line protocol (CLP) command request within a universal resource locator (URL) address from a browser-based client;
determining a target identifier within the URL address;
executing the CLP command on the target;
communicating an XML formatted response to the browser-based client upon executing the CLP command;
providing a CLP encoded response operable to be displayed as an HTML link within a web browser;
associating status information for plural hardware devices for a manageability access point (MAP); and
enabling display of information at the web browser associated with the plural hardware devices in response to a user selecting the HTML link.

9. The method of claim 8, further comprising:
decoding the URL address to extract a concatenated manageability access point (MAP) and a target identifier;
determining the CLP command; and
generating a response to the executed CLP command.

10. The method of claim 8, further comprising locating the target identified by the target identifier of the URL address.

11. The method of claim 8, further comprising:
obtaining additional hardware information in response to executing the CLP command;
formatting the additional hardware information using a mark-up language; and
communicating the formatted additional hardware information to the browser-based client, the formatted information sufficient to be presented within a web-browser of the browser-based client in response receiving the CLP encoded URL address.

12. The method of claim 8, further comprising:
receiving a representational state transfer (REST) configured URL address communication from the browser-based client, the communication including an empty query parameter field within the CLP encoded URL address; and
executing a default CLP command on the target in response to the empty query parameter field.

13. The method of claim 8, further comprising:
accessing a web based interface in response to receiving the CLP encoded URL address; and
requesting processing of the CLP command using a CLP proxy server.

* * * * *